United States Patent [19]
Padgett

[11] Patent Number: 5,062,495
[45] Date of Patent: Nov. 5, 1991

[54] REAR SUSPENSION SYSTEM FOR MOTORCYCLES

[76] Inventor: Ray T. Padgett, Rte. #1, Box 1253 C, Dawsonville, Ga. 30354

[21] Appl. No.: 539,550

[22] Filed: Jun. 18, 1990

[51] Int. Cl.$^5$ .............................................. B62D 61/02
[52] U.S. Cl. ................................... 180/227; 180/219; 280/283; 248/565
[58] Field of Search .............. 180/219, 227; 280/275, 280/283, 284; 267/195, 217, 221, 222; 188/321.11; 248/565

[56] References Cited

U.S. PATENT DOCUMENTS

| | | | |
|---|---|---|---|
| 401,237 | 4/1889 | Woodward | 280/283 |
| 4,408,674 | 10/1983 | Boyesen | 267/222 |
| 4,556,119 | 12/1985 | Shiratsuchi | 280/284 |
| 4,706,774 | 11/1987 | Tsuboi | 180/227 |
| 4,712,638 | 12/1987 | Kawaguchi et al. | 280/275 |

FOREIGN PATENT DOCUMENTS 923235   7/1947   France ................. 280/284

*Primary Examiner*—Charles A. Marmor
*Assistant Examiner*—Mitchell Bompey
*Attorney, Agent, or Firm*—Patrick F. Henry, Sr.

[57] ABSTRACT

A rigid motorcycle frame comprises a pair of spaced swingarms attached to a shock absorber which comprises a shock absorber casing or housing pivotally mounted on the swingarms and having a shock absorber rod which is pivotally attached to the motorcycle frame at a point below the housing whereby the movement of the rear wheel of the motorcycle causes the outer housing of the shock absorber to move upwardly relative to the shock absorber, rod which is attached to the motorcycle frame and which is opposite from the normal operation of a shock absorber. The shock absorber may include a spring means and/or hydraulic means to provide the usual resistance provided by a cushioning arrangement. In operation swing arms are moving downwardly the shock absorber moves its mounting points closer together which is different from most shock absorbers which move their mounting points further apart.

13 Claims, 1 Drawing Sheet

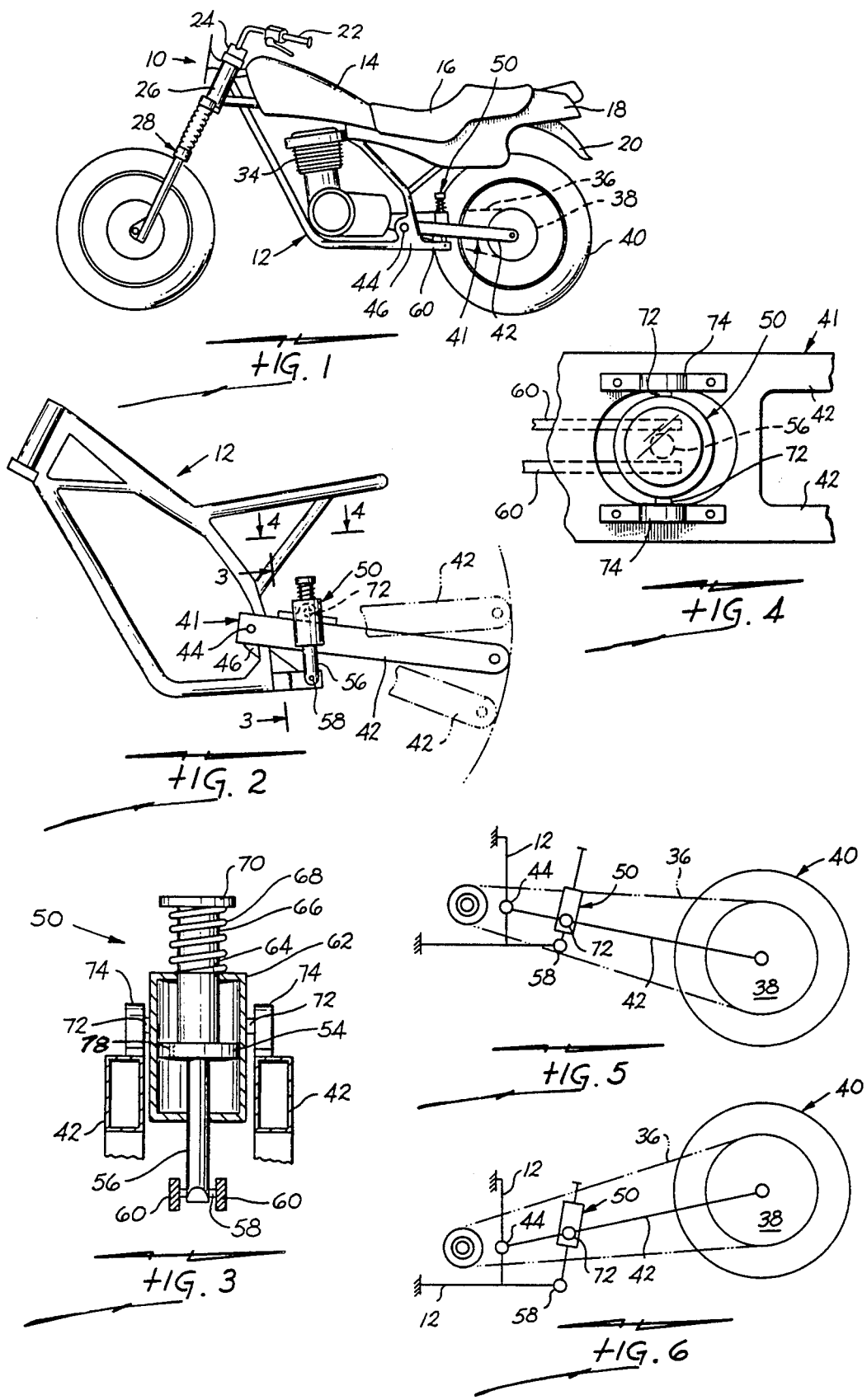

REAR SUSPENSION SYSTEM FOR MOTORCYCLES'

FIELD OF THE INVENTION

The motorcycle frame comprises a pair of spaced swing arms attached to a shock absorber which has a spring and a rod connected to a pivot on the frame and the cylinder attached to the two swing arms, whereby the shock absorber under load tries to pull its mounting points closer together.

BACKGROUND OF THE INVENTION

Most motorcycles in use today use a swingarm to locate the rear wheel relative to the motorcycle frame. The forward end of the swingarm pivots around a bolt running crosswise through the motorcycle frame or through brackets attached to the motorcycle frame to allow the rear wheel to move when it encounters a bump. The weight of the vehicle is supported by either one or two shock absorbers, which include a spring (mechanical or gas) and a means of damping the movement.

At one time, most motorcycle designs used two shock absorbers, with one shock absorber located on each side of the rear wheel and extending upward from the swingarm to the rearward part of the frame. In more recent years, a large number of designs using only one shock absorber have provided much better suspension performance. In such designs, the shock absorber is located forward of the wheel and extends from the area of the swingarm upward to an area under the forward portion of the seat. In many cases, the performance advantages of the single shock absorber designs are achieved by use of mechanical links at the top, the bottom, or both, which transmit the forces between the shock absorber and the frame and/or between the shock absorber and the swingarm. In these designs, either the upper end of the shock absorber and/or linkage and brackets uses space which could otherwise be used for an air filter box, a battery, or some other purpose.

SUMMARY OF THE INVENTION

The present system is used on a motorcycle rear suspension and employs a shock absorber mounted on a swing arm which comprises a pair of spaced swingarm members. The piston rod of the shock absorber is attached to a pivot on the bottom of the motorcycle frame and the housing or cylinder for the piston is attached to the swingarms. The shock pivots around a transverse or crosswise axis on the frame. The shock absorber tries to pull its mounting points closer together which is different from most shock absorbers which try to push their mounting points further apart. Thus, in the operation of the device when the rear wheel is driven upwardly with the swingarms, the shock absorber piston rod piston travel downwardly in the casing as the casing travels up with the swingarm.

The present design provides several advantages over conventional 1-shock absorber designs:

1. The subject design results in a lower center of gravity of the motorcycle.
2. A mounting point strong enough to withstand the suspension loads in the upper rear portion of the motorcycle frame is not required. Also, neither the upper end of the shock absorber nor suspension linkage occupies space in the upper rear frame area. This allows more freedom in the size and location of air filter boxes, batteries, etc.
3. The shock absorber upper mounting bolt in many conventional 1-shock absorber designs is not very accessible which makes shock absorber removal difficult. The present design provides easy access to the mountings which makes removal of the shock absorber easier.
4. Many conventional shock absorber designs are such that the shock absorber and/or suspension linkage reduce accessibility of other items such as air filters, and other items for service and maintenance. The present designs allows such items to be more accessible.
5. The subject suspension designs allows a simpler motorcycle frame to be used.

Other and further objects and advantages of my invention will become apparent upon reading the subsequent description of a preferred embodiment taken in conjunction with the accompanying drawings.

BRIEF DESCRIPTION OF THE FIGURES OF THE DRAWINGS

FIG. 1 is a side elevation view of a motorcycle having the present suspension system installed thereon with the rear wheel.

FIG. 2 is a side elevation view of the frame in FIG. 1 with parts broken away.

FIG. 3 is a cross-sectional view taken along lines 3—3 in FIG. 2.

FIG. 4 is a cross-sectional view taken along lines 4—4 in FIG. 2.

FIG. 5 is a diagrammatic mechanical view showing the frame shock absorber and rear wheel in normal driving conditions.

FIG. 6 is a diagrammatic view similar to FIG. 5 but with the rear wheel raised to illustrate a load condition.

BRIEF DESCRIPTION OF A PREFERRED EMBODIMENT

A typical motorcycle 10 has a rigid, tubular frame 12 on which is mounted a gas tank 14, a seat 16, a housing 18 and a wheel cover 20. Handlebars 22 connected to a handlebar shaft 24 rotatably mounted in a shaft housing 26. Shaft 24 is connected to a front fork which carries a coil spring 30 and a front wheel 32 is mounted in the front fork 28. An engine 34 is mounted on frame 12 beneath the tank 14 and is connected by a chain 36 driving the rear wheel sprocket 38 to drive the rear wheel 40 which is supported by a swingframe 41 pair of spaced swingarm member 42 pivotally mounted on a pivot 44 which is attached to frame 12 on a plate 46. Pivot 44 extends transversely or crosswise of the frame 12.

A shock absorber or cushioning means 50, referring to FIG. 3, comprises an outer cylinder or housing 62 in which is mounted a piston 54 attached to a piston rod 56 which is pivotally attached on a pivot 58 inside of spaced projecting members 60 of respective frame 12. The upper end of cylinder 62 has an opening 64 therein through which projects a tubular shaft 68 having a coil spring 66 thereon held in place by a spring plate 70. Shock absorber 50 is pivotally attached by pivots 72 to respective spaced bearing supports 74.

The mounting of the shock absorber 50 having the cylinder 52 supported on pivots 72 allows the shock absorber 50 to pivot around a crosswise or transverse axis. With reference to the skeletal view in FIG. 5 the suspension including swingarms 42 is a non-compressed state whereby the wheel 40 is at a low position relative to the frame 12. In FIG. 6 the suspension including swingarms 42 is compressed whereby the wheel 40 is at a higher position relative to frame 12. Accordingly, the shock absorber 50 is required to be one which, when wheel 40 is moving downwardly in FIGS. 5 and 6, tries to pull its mounting points at pivot 72 and pivot 58 closer together which is, different from most shock absorbers which under the same condition try to push their mounting points further apart. Thus, in the operation of the shock absorber 50 from the position shown in FIG. 5 to the position shown in FIG. 6 results in the movement of the rod 56 and piston 54 inside the closed cylinder 62 to drive the cylinder 62 upwardly in the manner shown in FIG. 6 thereby moving the cylinder 62 relative with the swingarms 42 to bring the piston 54 downwardly in cylinder 52 and to bring the plate 70 downwardly to compress spring 68 thereby compressing spring 68 between plate 70 and the top 76 of cylinder 62. Spring 68 resists the load on the suspension by pushing the rod 56 and shafts 66 upward relative to the bearing plates 74 and pivot 72. The internal volume of the cylinder 62 can contain hydraulic oil which is forced to flow between various internal chambers as the suspension moves. The flow of this oil can be regulated by various valving arrangements to produce damping suitable for the intended uses of the suspension in accordance with well known principles and designs of existing hydraulic shock absorbers. For example, piston 54 could be provided with an opening or orifice 78 so that hydraulic oil contained within the cylinder 62 would be forced through the opening during the movement of the piston 54.

While there is shown a preferred embodiment of this invention involving a particular mode of operation this is by way of illustration and does not constitute any sort of limitation on the scope of the invention since there are various alterations, changes, deviations and departures which may be made in the preferred embodiment without avoiding the scope of the invention defined by proper interpretation of the appended claims.

What is claimed is set further hereafter:

1. In a suspension system for a motorcycle which has a steerable front wheel and a driven rear wheel:
   a motorcycle frame having the steerable front wheel mounted thereon,
   a movable swingframe supporting said rear wheel for movement on said frame,
   a shock absorber comprising an outer casing thereof mounted on mounting points on said motorcycle frame and said swingframe for movement therewith,
   said shock absorber including means for cushioning and resisting said shock absorber casing, and
   said shock absorber being arranged so that when the rear wheel is moved downwardly, the mounting points are moved closer together.

2. The suspension claimed in claim 1, wherein: said shock absorber casing has a piston supported for movement therein and said piston attached to a piston rod member on said frame.

3. The device claimed in claim 2, wherein: said movable piston moves in said casing when said swingframe is moved upwardly with said wheel.

4. The suspension claimed in claim 3 wherein said shock absorber casing is a cylinder pivotally mounted on opposite sides thereof in a respective bearing frame which is attached to a respective side on said swingframe.

5. The suspension claimed in claim 1 wherein said shock absorber causing is pivotally mounted on said swingframe on opposite sides thereof and said casing is pivotally mounted to said frame beneath said swingframe.

6. The suspension claimed in claim 2 wherein said shock absorber includes a spring means mounted between said shock absorber casing and said movable piston to resist and cushion the movement of said casing when said swingframe is moved upwardly with said wheel.

7. The suspension claimed in claim 2 wherein said shock absorber casing is a cylinder pivotally mounted on opposite sides thereof in a respective bearing frame which is attached to a respective side on said swingframe.

8. The suspension claimed in claim 6 wherein said shock absorber casing is pivotally mounted on said swingframe on opposite sides thereof and said is pivotally mounted to said frame beneath the swingframe.

9. In a suspension system for a motorcycle which has a steerable front wheel and a driven rear wheel:
   a motorcycle frame having the steerable front wheel mounted thereon,
   a movable swingframe supporting said rear wheel for movement on said frame,
   a shock absorber mounted at a respective mounting point on said motorcycle frame and said swingframe,
   said shock absorber being mounted so that during movement the mounting points are moved closer together when the rear wheel and swingframe move downwardly on said motorcycle frame.

10. The suspension claimed in claim 9, wherein: said shock absorber comprises a casing, a piston supported for movement in said casing, said piston being attached on said frame to a shock absorber piston rod member for movement therewith.

11. The device claimed in claim 10 wherein: there is a spring mounted between said shock absorber casing and said movable piston to resist the movement of said casing when said swingframe is moved upwardly with said wheel.

12. The suspension claimed in claim 11 wherein said shock absorber casing is a cylinder pivotally mounted on opposite sides thereof in a respective bearing frame which is attached to a respective side on said swingframe.

13. The suspension claimed in claim 11, wherein: said shock absorber casing is pivotally mounted on said swingframe and said piston rod member is pivotally mounted on said frame beneath said swingframe.

* * * * *